United States Patent [19]

Bowers et al.

[11] 3,825,735

[45] July 23, 1974

[54] COMMAND PULSE GENERATOR FOR COMPUTER-CONTROLLED MACHINING

[75] Inventors: Gary L. Bowers; Clark M. Lay, both of Clinton; Albert E. Stephens, Knoxville, all of Tenn.

[73] Assignee: The United States of America as represented by the United States Atomic Energy Commision, Washington, D.C.

[22] Filed: Nov. 12, 1973

[21] Appl. No.: 415,078

[52] U.S. Cl.... 235/151.11, 235/92 TF, 235/150.31, 235/152, 318/569
[51] Int. Cl. ............................................ G05b 19/40
[58] Field of Search ...... 83/71; 235/150.31, 151.11, 235/152, 92 T, 92 TF, 92 FQ; 318/569–571, 573–574, 603; 444/1; 307/208, 225, 269, 271; 328/63

[56] References Cited
UNITED STATES PATENTS
3,701,890   10/1972   Dummermuth ............... 235/150.31
3,757,095   9/1973    Kiwiet ........................... 235/151.11

Primary Examiner—Charles E. Atkinson
Assistant Examiner—R. Stephen Dildine, Jr.
Attorney, Agent, or Firm—John A. Horan; David S. Zachry; David E. Breeden

[57] ABSTRACT

A system has been provided for generating travel command pulses in a machine tool positioning system under computer control which reduces computer computation time and at the same time allows increased machine tool travel speed. Pulse motors driven by pulse trains generated by the system under computer control provide the means for axis movement of the tool. The pulse trains for the axes movements are generated by an addition technique in a hardware hydrid digital differential analyzer. A 24-bit word representing the distance to be traveled along an axis is loaded from the computer core memory into a 24-bit distance register along with an 11-bit word loaded into a 11-bit clock store register which defines the amount of time allowed for tool travel corresponding to the given distance value. Addition is performed serially for each axis in parallel by corresponding 2-bit binary full adders having one input from the particular 24-bit distance register and another input from a 24-bit sum register which is initially cleared. The clock store register, after being loaded by the computer, loads the value into a counter which is counted to an overflow condition. This generates a train of 24 pulses which shift the contents of the distance register and the sum register into the binary full adder. The sum at the adder output is serially loaded into the sum register and repeatedly added to the original distance value, circulated in the distance register, at a rate determined by the rate of application of the train of 24 pulses applied to shift the contents of the distance and sum registers into the adder. A command pulse is generated each time the 24th pulse of a pulse train is generated provided there is an enable due to an overflow in the adder. The time interval between each 24-bit serial addition is determined by the value stored in the clock store register. The addition process is complete for a specific block when a marker bit is in the leftmost bit position followed by all zeros in the sum register. This system requires considerably fewer electronic components and less complicated circuitry to achieve the generation of command pulses at a faster rate while reducing computer time.

6 Claims, 6 Drawing Figures

| Fig.3A | Fig.3B | Fig.3C |

COMMAND PULSE GENERATOR FOR COMPUTER-CONTROLLED MACHINING

BACKGROUND OF THE INVENTION

The present invention relates generally to computer-controlled machining and more specifically to a system for generating tool position command pulses from part description data stored in the core memory of the controlling computer.

The present invention was made during the course of, or under, a contract with the United States Atomic Energy Commission.

In the art of automatic machine tool control, it has generally been the practice in the past to employ systems generally described as numerical controllers (NC) wherein part description data is normally stored on punched tape in numerical form and read into a servo controller by means of a tape reader which, in turn, generates command pulses to position the machine tool. The command pulses are compared in a servo system with actual position pulses to produce an error signal in the usual manner to move the tool until the error signal is reduced to zero. Some of the limitations of the NC systems are tape reader reliability (electromechanic nature), closed loop servo feedback problems, total system cost and total circuit complexity.

In order to provide closer control of part precision, surface finish, and system reliability, it has been generally accepted that a computer augmented system is necessary for implementation of adaptive control techniques. These systems, referred to as "Computer Numerical Control" (CNC), range from using the computer for all control functions including interpolation to mating a computer with a standard NC unit.

The particular CNC system with which this invention is particularly useful is a system that uses the computer for stored part programs in a binary format converted from the standard NC part description data tape while interpolation functions that demand constant attention are performed by hardware. The resulting system is extremely reliable through the use of stored part programs (which eliminate tape reader), open loop servo control, and constant operational checks.

In this system of open loop control typically electrohydraulic pulse motors, one for each axis of movement, are used to position the machine tool and are driven by pulse trains generated by a digital differential analyzer (DDA).

A DDA may be thought of as a system comprising two distinct parts or functions. The first function is digital integration which is a repeated binary addition operation in which command pulses are generated during each addition operation which overflows a binary adder. The spacing between overflow pulses depends on the nature of the binary addition processes, and although the spacing may be irregular (i.e., each addition may not generate an overflow), the correct number of overflow pulses for one complete motor axis movement is always generated in a period of time that satisfies a desired feed rate requirement.

The second DDA function is add command generation. The add command generator receives the feed rate information and generates interrupt signals to the digital integrator and determines, by the spacing between these signals, the rate at which the binary addition in the digital integration proceeds.

In an initial design employing computer control, the DDA integration function was carried out by software within the computer controlled by hardware generated add command interrupts. This system was found to limit the travel speed or rate of command pulses. Since the time consumed in software addition must be less than the time between successive add interrupt signals and this addition time was determined to be about 125 microseconds maximum for a computer suited for this application, the maximum command pulse rate would be 480K pulses per minute or a travel speed of 12 ipm. However, certain distance values do not provide an addition overflow for each addition and the command pulse rate could drop to a minimum of 250 microseconds, or two software additions, reducing the travel speed of 6 ipm. This speed imposes a limitation on the maximum traverse rate and possibly restricts some machine-tool cutting speeds. In machines with additional axes, the maximum travel speed is further reduced in that the additions, which cannot be processed simultaneously, require more computer time.

In order to eliminate the restrictions imposed by the hardware/software adder, a hardware DDA has been provided which is the subject of this invention. The time per addition has been reduced from the approximately 125 microseconds to approximately 10 microseconds and the maximum command pulse rate is now limited by the tool drive motors which is approximately 10.3K pps or 15 ipm.

SUMMARY OF THE INVENTION

In view of the above, it is an object of this invention to provide a hardware digital differential analyzer for a computer-controlled positioning system which does not require computer computation time to generate position command pulses from part description data stored in memory in said computer.

Further, it is an object of this invention to provide a DDA as in the above object having an improved add command generator for controlling the addition process of the DDA.

Other objects and many of the attendant advantages of the present invention will be obvious from the following detailed description of the invention taken in conjunction with the accompanying drawings.

DETAILED DESCRIPTION

Figure 1:
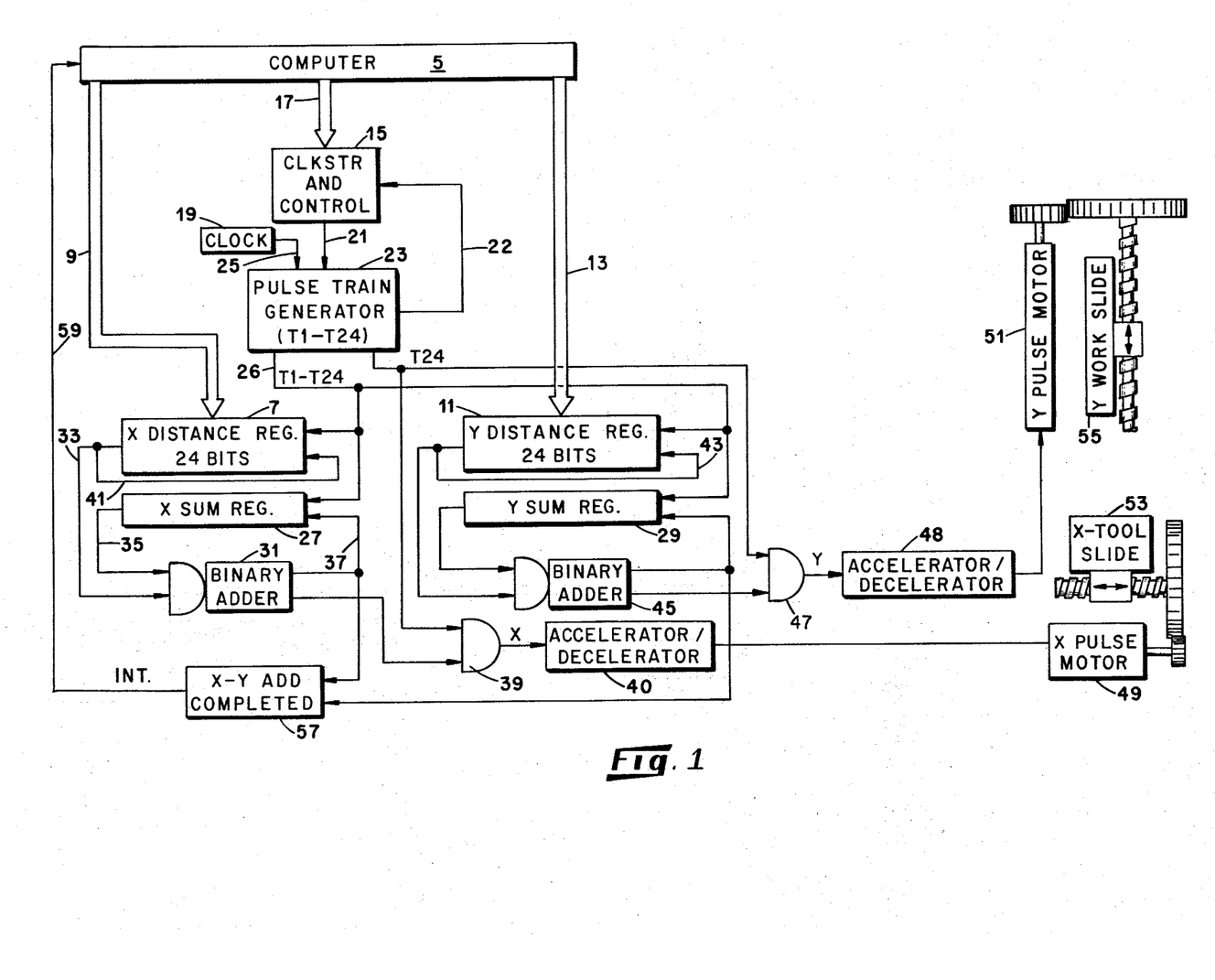
FIG. 1 is a block diagram of a two-axis computer controlled machine employing the command pulse generator of the present invention.

Referring now to FIG. 1, there is shown a block diagram of a CNC positioning system employing the present invention in an open loop control mode. A computer 5, typically having an 8K, 24-bit word core memory capacity, is provided with control program data and part description data storage. Typically, the control functions are standard functions, such as in a machining operation on a two-axis lathe, which includes spindle speed, turret position, etc. These functional provisions are well known in a CNC positioning system and thus need not be included here to illustrate the invention. It will be understood that this system may be modified to accommodate a single axis or multiple axis machine. Thus, according to the preferred embodiment of the invention, the computer is connected to a 24-bit X distance shift register 7 via a 24-line connector cable 9 and an identical 24-bit Y distance shift register 11 by means of a 24-line connector cable 13. Registers 7 and 11 are of conventional type which may be either parallel or serially fed. The computer further has an output connected to a clock store (CLKSTR) register and control circuit 15 which contains a 11-bit register coupled to the computer by means of a 11-line connector cable 17, as will be explained in detail hereinbelow.

The CLKSTR value stored in a CLKSTR register of circuit 15 is repeatedly used to preset a counter which is counted to overflow by means of pulses from a pulse train generator 23 having an output connected to circuit 15 by means of line 22. A count overflow is carried by means of line 21 to an enabling input of the pulse train generator 23 which receives the clock pulses from clock 19 via line 25. The pulse train generator 23 provides a burst of 24 clock pulses (T1–T24) on an output line 26 each time it receives an overflow add command from circuit 15. Line 26 is connected to the clock inputs of registers 7 and 11 and also to the clock inputs of X and Y sum registers 27 and 29. For example, in generating the X axis command the clock pulses shift the contents of both registers 7 and 27 one bit at a time into a binary full adder 31 via lines 33 and 35, respectively, and the sum is serially reloaded into the sum register via a serial data line 37. The 24 clock pulses circulate the 24 bits in the distance register and the sum register through the adder 31 and if the last bit through the adder provides an overflow, it is gated through an AND gate 39 having one input connected to an overflow output of adder 31. Gate 39 is enabled by the T24 pulse applied to the other input of gate 39 from the generator 23. As shown in FIG. 1 the outputs of the X and Y distance registers are fed back to a serial input via feedback lines 41 and 43, respectively, so that the distance numbers remain in the registers 7 and 11 until cleared as will be explained hereinbelow.

The Y axis command pulses are generated in the same manner as described above for the X axis command pulses. The contents of the registers 11 and 29 are serially fed by the clock pulses T1–T24 into an identical adder 45 whose output is serially fed into the Y sum register 29 and the Y command pulses are gated by AND gate 47 in the same manner if the last addition contains an overflow at the time the T24 pulse is applied to gate 47.

The outputs of gates 39 and 47 are connected to X and Y pulse motors 49 and 51 through accelerator/decelerator circuits 40 and 48, respectively. The purpose of the accelerator and decelerator circuits 40 and 48 is to prevent the loss of pulses between extreme speed transitions from one data block to another. This is a well-known technique in the use of pulse motors for positioning systems. The motors 49 and 51, in turn, drive the X axis tool slide 53 and the Y axis work slide 55, respectively, the typical arrangement for a two-axis turning lathe.

Figure 2:
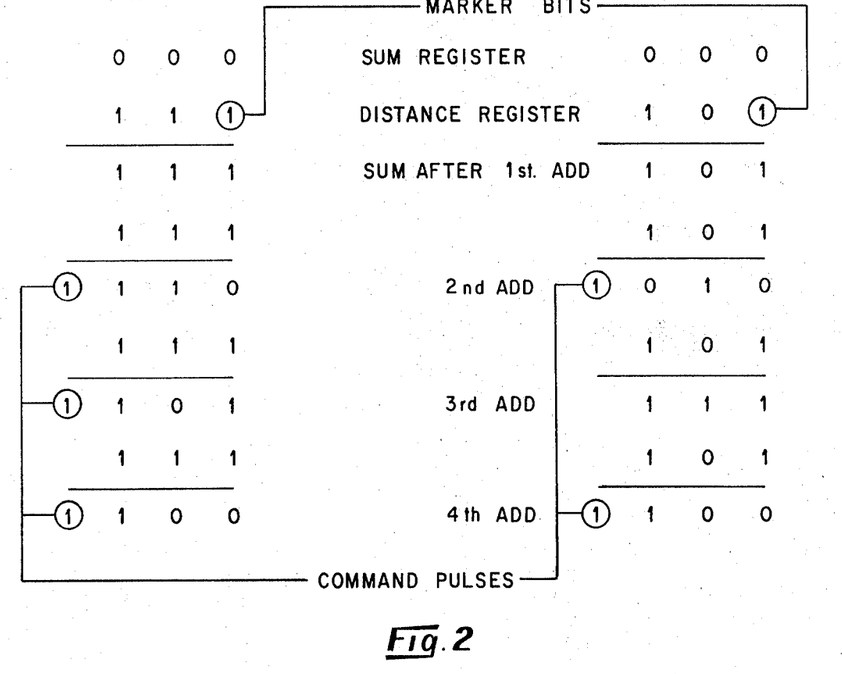
FIG. 2 is an illustration of the addition process employed in the system of FIG. 1 to generate the axis position command pulses.

Referring now to FIG. 2 in combination with FIG. 1, it will be readily seen how the command pulses are generated from the binary addition. The magnitude of the CLKSTR number loaded into the CLKSTR register of circuit 15 determines the rate at which add-interrupt signals are generated. Shown in FIG. 2 are two simple examples of distance numbers in binary form which may be loaded into either the X or Y distance registers 7 or 11. The left hand column is an addition process for a distance value 111 loaded into a distance register as indicated. The sum register is always initially cleared to zero count as indicated. The number loaded in the distance register for the left hand column is the number three in binary notation with the last bit loaded as a binary 1 marker bit as indicated in the figure. The additional marker bit added by the computer program is the key to providing the command pulses from the binary addition steps as will now be explained. The first addition simply shifts the distance value, here 111, into the sum register and no command pulse is generated on the first addition. As shown in the left column, for the distance value 11, a command pulse is generated for each addition as indicated by the leftmost circled 1's which is an overflow from adder 31. The addition continues until the code 100, excluding the overflow bit, is obtained and it will be appreciated that no matter what the distance value is, the number of command pulses generated before or simultaneous with the 100 code will be the distance value including the marker bit in binary form in the leftmost bit excluding the circled overflow bit or more specifically three command pulses are generated according to the binary notation 11 (actual distance value) excluding the marker bit. To further illustrate the process, it will be seen that in the right column of FIG. 2 an actual distance value of 10 (number 2) with the marker bit added for a distance value of 101 loaded into a distance register results in the generation of two command pulses before or simultaneous with the 100 code.

The 100 code for both the X and Y axis is recognized by logic circuitry 57 so that when both the X and Y axis additions are completed, which should be at the same number of additions if there are no errors, the X and Y add complete logic 57 will generate an interrupt to computer via line 59 to clear both the X and Y distance registers 7 and 11 and the CLKSTR register of circuit 15 and then load the next block of distance data into registers 7 and 11 along with the CLKSTR value to initiate the next addition cycle. This operation will be described in more detail in the description of FIG. 3.

Figure 3:
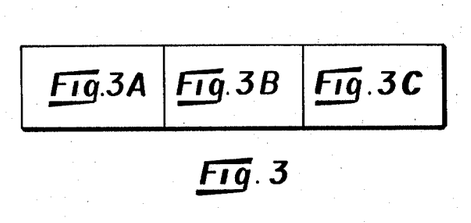
FIG. 3, which consists of FIGS. 3A, 3B, and 3C, is a logic diagram of the command pulse generators shown in block diagram form in FIG. 1.
Figure 3A:
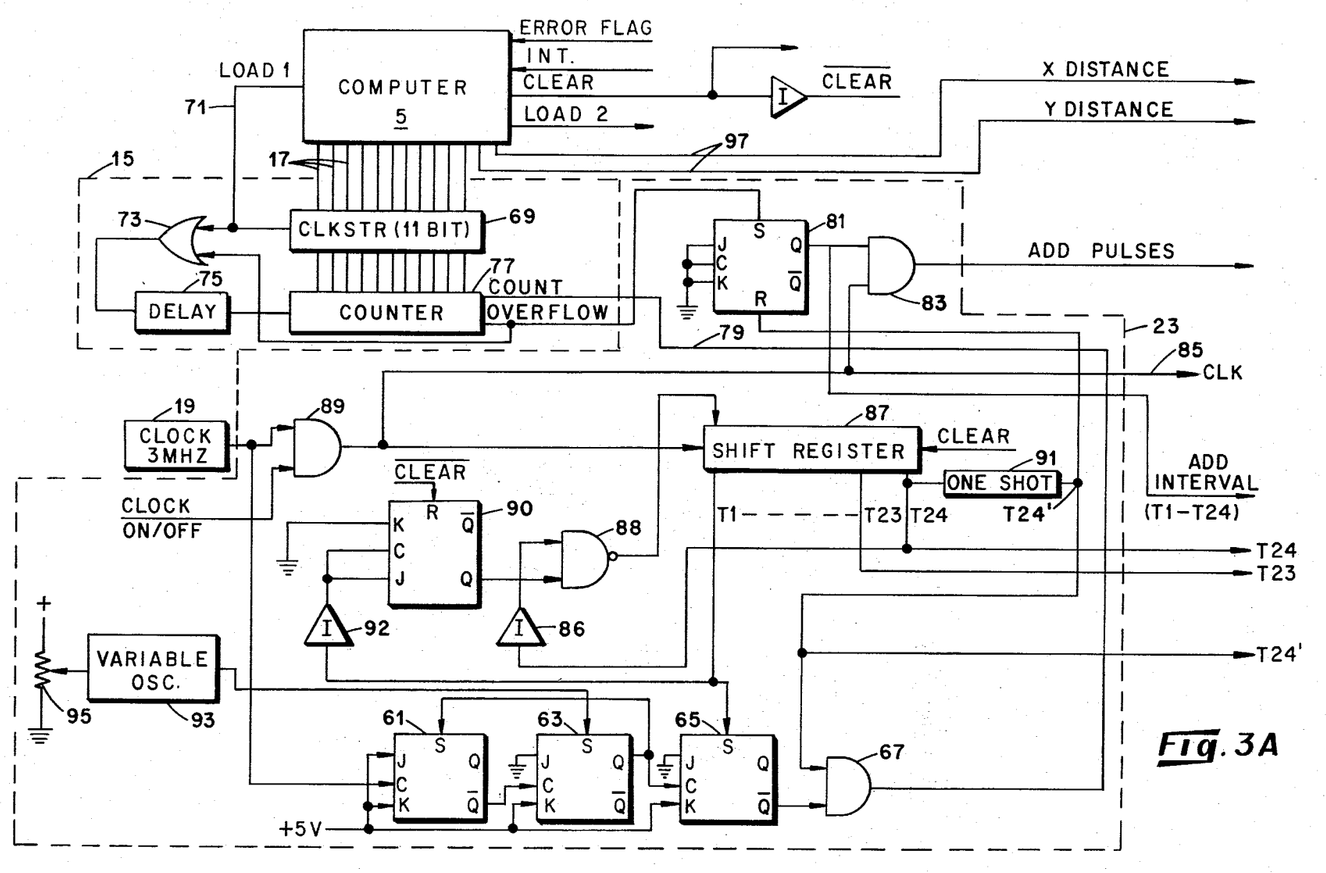
Figure 3B:
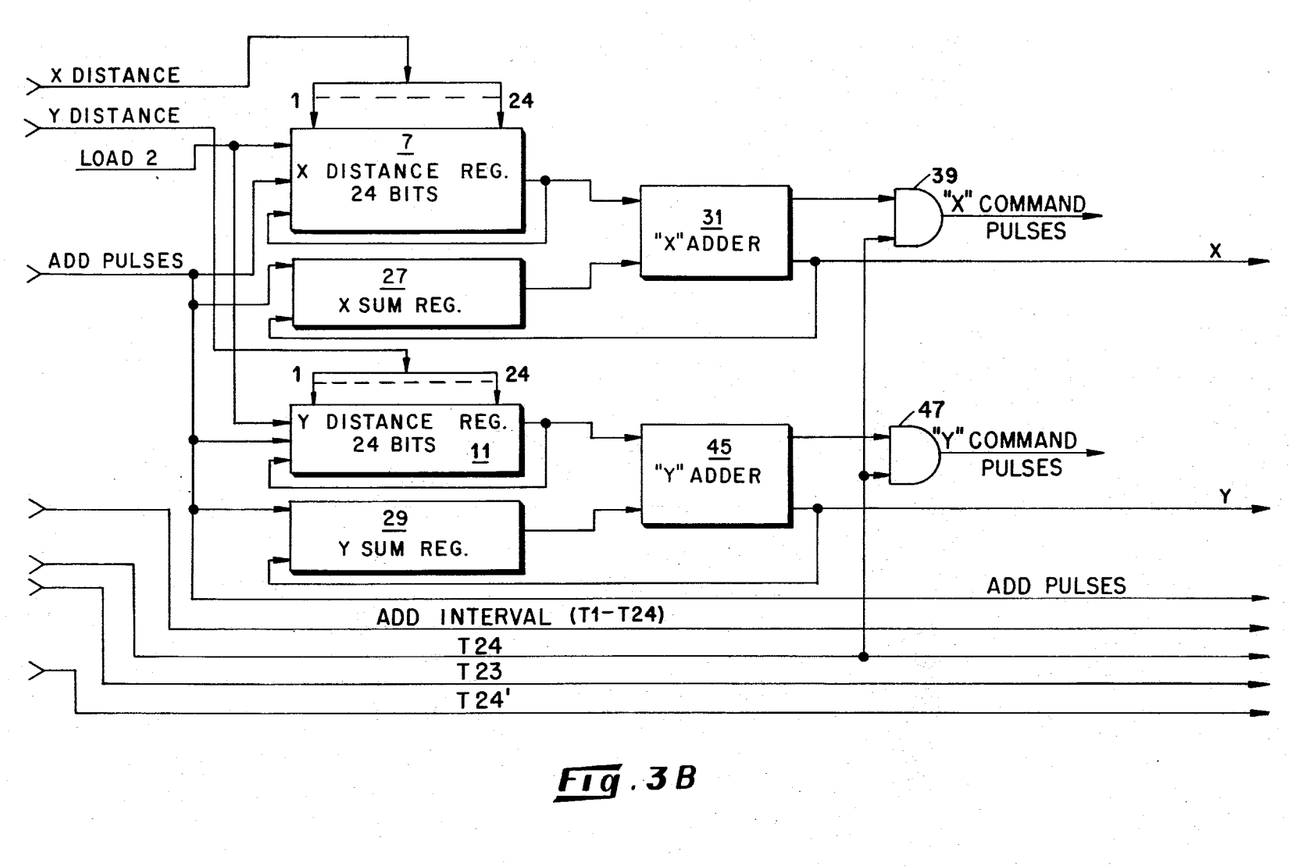
Figure 3C:
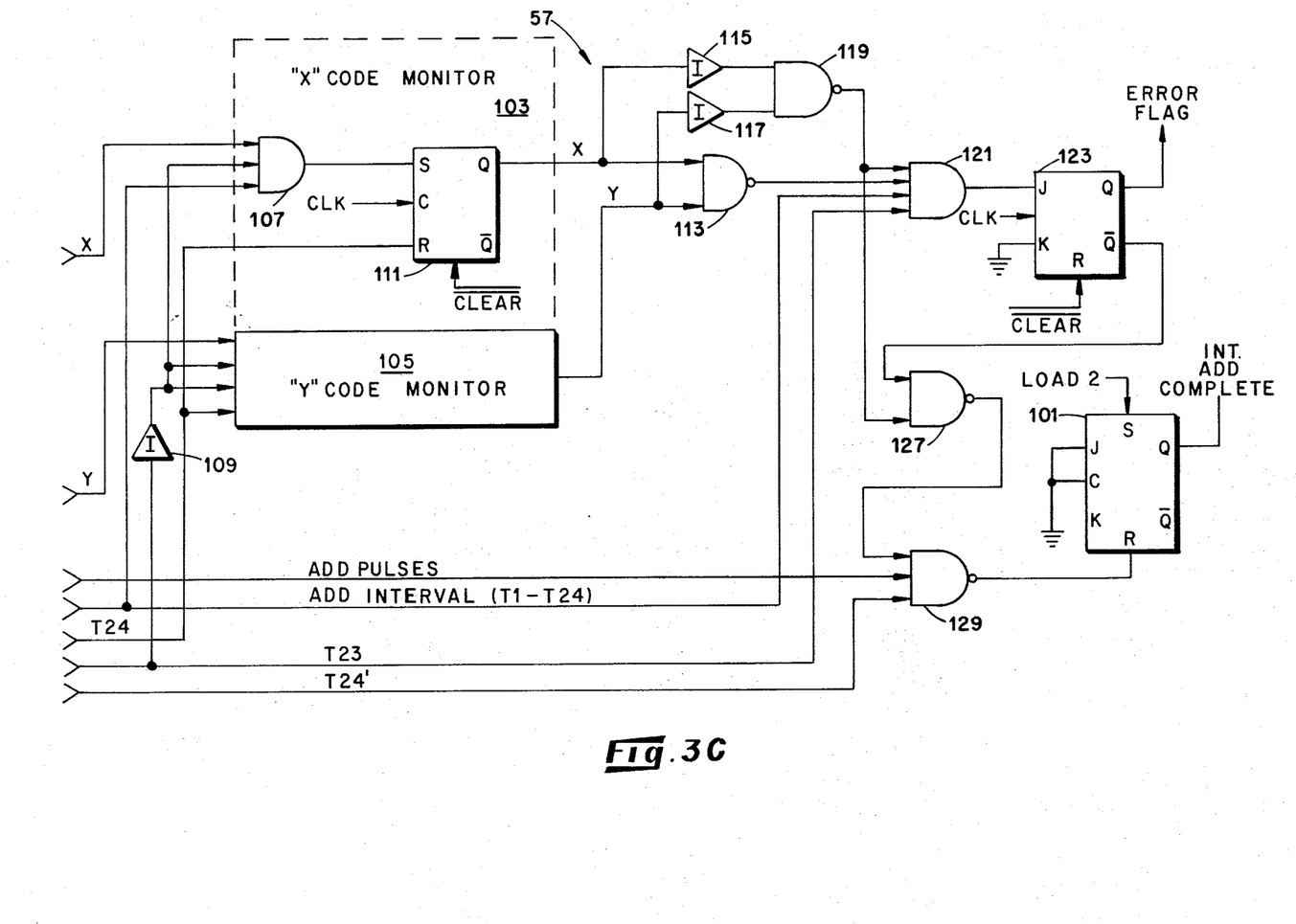

Referring now to FIG. 3, which is shown to comprise the separate drawings of FIGS. 3A, 3B, and 3C, there is shown a detail logic diagram of portions of the system shown in block diagram form in FIG. 1 with like parts identified by the same reference numerals. Shown in FIG. 3A is the heart of the invention which includes the timing and add command generation function depicted in blocks 15, 19, and 23 of FIG. 1 including the computer 5. The 11-bit feed rate number (CLKSTR) is loaded via eleven lines from the computer 5 to a clock store (CLKSTR) register 69 from a computer load command on line 71 connected to the load control input of register 69. Register 69 is a parallel load, 11-bit, storage register. The load command line 71 is further connected through one input of an OR gate 73 and a delay circuit 75 to the load control input of a parallel load 12-bit presettable binary counter 77. The counter 77 is counted to overflow by means of count pulses applied to the count input via line 79 from the pulse generator 23 as will be described below. The overflow output of counter 77 is connected to the set (S) input of a flip-flop 81 which has its set output (Q) connected to one input of an AND gate 83 which is enabled by the setting of flip-flop 81 from the counter 77 overflow to gate twenty-four 3 MHz clock pulses via the clock pulse line 85 connected to the other input of AND gate 83.

The passage of only 24 clock pulses through AND gate 83 is controlled by a binary ring counter which may be simply a 24-bit shift register 87 with a feedback circuit to set the first bit to a one at T1 and shift the one through the register 87 by means of the 3 MHz clock pulses. The last bit of register 87 is connected through an inverter 86 to one input of a NAND gate 88 which has its output connected to bit 1 of register 87. The other input of gate 88 is connected to the Q output of a J/K flip-flop 90. Flip-flop 90 has its C and J inputs connected to the output of an inverter 92 which has its input connected to the T1 output of register 87. The K input of flip-flop 90 is connected to ground. The output of the clock 19 is connected to one input of an AND gate 89 having an enabling input connected to an "ON-OFF" switch (not shown) so that when the system is turned "ON" a logic 1 is applied to the AND gate 89, thereby enabling the passage of the clock pulses to the clock line 85 and the shift input of register 87. Register 87 has separate outputs for each of the counts (T1 through T24).

Register 87 is initially cleared and enabled to apply a one to the first bit position on the following clock pulse by means of applying the CLEAR signal to the reset (R) input of flip-flop 90 causing the Q output to go low and the output of NAND gate 88 to go high. The clock pulse places the one in the first bit position. This causes the output of inverter 92 to go low, thereby setting flip-flop 90 (Q output high). Since T24 is also high, the output of gate 88 goes low to prevent additional bits to be shifted into the first bit position of register 87. The clock continues to shift the bit through register 87 and when T24 goes high, it is fed back to the first bit as described above by causing the output of gate 88 to go high and the cycle is repeated.

The T24 count output of register 87 is also connected to the trigger input of a one-shot 91 which is timed to adjust the width of the T24 pulse for timing purposes which generates a T24' pulse. The output of one-shot 91 (T24') is connected to the direct reset input of a J/K flip-flop 81 connected to function as a simple set-reset flip-flop by grounding the J, K and clock inputs. The period of one-shot 91 is shorter than one clock cycle, but sufficient to allow the passage of the twenty-fourth clock pulse through gate 83 before flip-flop 81 is reset by the negative going signal when one-shot 91 times out, removing the enabling input to gate 83. As will be more fully understood from the description hereinbelow, the Q output of flip-flop 81 will remain high or set for the add interval requiring the passage of 24 clock pulses corresponding to the count period (T1-T24) of the shift register 87. The register 87 is synchronized with the gating of the 24 clock pulses by means of a sync circuit including J-K flip-flops 61, 63, and 65 and an AND gate 67 having one input connected to the Q output of flip-flop 65 and the other input connected to the output of one-shot 91. The output of AND gate 67 is connected to the count input of counter 77 via line 79; and as will now be explained has a maximum count rate of 125 KHz (one pulse every 8 microseconds), corresponding in time to the T24' pulse. The flip-flop 61 of the sync circuit is a J-K flip-flop having its clock input (C) connected to the output of the clock 19 and the J and K inputs connected to a +5V supply so that the flip-flop complements on each clock pulse as long as the preset (S) input is high. The reset Q output of flip-flop 61 is connected to the clock input of flip-flop 63 which has the J input grounded (logic 0) and the K input connected to the +5V supply (logic 1) so that a pulse at the clock input can only cause flip-flop 63 to be reset (Q high) if it was initially in the set condition, the clock will not set the flip-flop with the J input grounded. The direct set (S) or preset input of flip-flop 63 is connected to a variable oscillator 93 which has a negative pulse output with a maximum frequency of 125 KHz and may be used to override the controlled machine feed rate in a unique manner by selected blanking of the T24' pulses to the count line 79 from gate 67 as the frequency is lowered by manual adjustment of a potentiometer 95 used to control the oscillator frequency. Each negative portion of a cycle of the oscillator 93 output presets flip-flop 63 causing the set output (Q) to go high which, in turn, insures that flip-flop 61 is enabled at the same time by connecting the Q output of flip-flop 63 to the preset (S) input of flip-flop 61. Further, the Q output of flip-flop 63 is connected to the clock input of flip-flop 65 which also has its J input grounded and K input connected to the +5V supply. The preset (S) input of flip-flop 65 is connected to the T1 output of register 87 so that it is preset on each T1 pulse. It will be understood that the register 87 continuously cycles once every 24th clock pulse. Therefore, at pulse T1 flip-flop 65 is preset and remains set (Q low, blocking gate 67) until flip-flop 63 is preset and subsequently reset by a negative going signal from Q of flip-flop 61. Since the clock 19 frequency is over twenty times the maximum oscillator 93 frequency, it will be understood that flip-flop 63 is reset almost immediately after the oscillator signal goes positive releasing the preset, and thus cannot be set again until the next oscillator cycle. The resetting of flip-flop 63 causes Q output to go low, thereby resetting flip-flop 65 which has been preset by the T1 pulse. This causes the Q output of flip-flop 65 to go high enabling AND gate 67 to pass the T24' pulse from one-shot 91. The maximum frequency of 125 KHz from the oscillator 93 is equal in period to the 24 clock pulses necessary for the add interval of the 24-bit addition and thus cannot exceed the add interval. Therefore at the maximum input level (125 KHz), there is no delay of T24' pulses to counter 77 and the CLKSTR controls the rate. However, by reducing the frequency of oscillator 93, the operator can override the programmed rate at which counter 77 overflows. When the feed rate is set at some intermediate point, by adjusting potentiometer 95, in order to reduce an axis velocity, gate 67 is disabled for longer periods of time, resulting in a certain number of T24' pulses not reaching the counter 77 and thereby slowing down the overflow of the counter. By reducing the oscillator 93 frequency it extends the period in which flip-flop 65 stays in the preset state (Q low) following a T1 pulse. Since 65 will not reset until flip-flop 63 sees the negative going pulse from the Q output of flip-flop 63 following a preset (Q high) by the oscillator 93, the gate 67 is blocked for longer periods as the oscillator 93 frequency is decreased.

Referring now to FIG. 3B, it will be seen that the train of 24 pulses having a repetition rate (i.e., time between the burst of 24 clock pulses at the output of gate 83) controlled by the CLKSTR number are fed to the clock inputs of the X and Y axis distance and sum registers. As explained above with reference to FIG. 1, the 24 clock pulses cycle the 24 bits of both the distance registers 7 and 11 and the corresponding sum registers through the X and Y axis adders 31 and 45. The X and Y axis commands are then generated by the addition process as shown in FIG. 2. The overflows of adders 31 and 45 at the T24 pulse are gated by means of the AND gates 39 and 47, respectively, through application of the T24 pulse to the enable inputs of gates 39 and 47.

In order to recognize the end of block for a particular distance value loaded in the X and Y distance registers 7 and 11 from computer 5, the add complete circuit logic, as shown in detail in FIG. 3C, is provided. Remembering that for any distance value loaded in either of the registers 7 and 11, as illustrated in FIG. 2, will always produce a value in the sum register following the last necessary addition which sets the leftmost bit (bit 1) to a logic 1 condition followed by all zeros in the second through 24th bits. When this code is present during an addition, the circuit of FIG. 3C operates to generate an end of block interrupt to the computer by resetting a flip-flop 101 (Q low) which has the Q output connected to the end of block interrupt of computer 5 (FIG. 3A). Flip-flop 101 is set by the LOAD 2 pulse from the computer 5 when the distance registers 7 and 11 are loaded. To illustrate the circuit, the X axis code recognition will be explained and illustrated in detail with respect to the X code monitor 103. It will be understood that the Y code monitor 105 is an identical circuit. Each monitor circuit receives the serial data output line of the corresponding adder at corresponding inputs. As illustrated, the X adder serial data line is connected to one input of an AND gate 107 which also receives the add interval signal (T1-T24) from the Q output of flip-flop 81 (FIG. 3A) at a second input. The third input of AND gate 107 is connected to the output of an inverter 109 which has its input connected to the T23 output of register 87 (FIG. 3A). The output of gate 107 is connected to the set (S) input of a flip-flop 111 which has its reset input (R) connected to the T24 output of register 87 and the clock input connected to the system clock (CLK). The output of the X code monitor 103 is taken at the Q output of flip-flop 111 which is connected to one input of a NAND gate 113. The Y code monitor 105, as stated above, is identical to the X monitor 103 and the output is connected to the other input of NAND gate 113. The outputs of monitors 103 and 105 are also connected, respectively, to the inputs of a pair of inverters 115 and 117 whose outputs are connected to respective inputs of a NAND gate 119.

The output of NAND gate 113 is connected to one input of an AND gate 121 which has additional inputs connected to the T23 output of register 87, the Q output of flip-flop 81 (add interval) and the output of NAND gate 119, respectively. Gate 121 determines if there is an error in the positioning system at the end of a distance block. The output of gate 121 is connected to the J input of a J/K flip-flop 123. If the output of gate 121 goes high at the end of a block, it is applied to the J input of flip-flop 123 which allows the clock (CLK) connected to the C input of flip-flop 123 to set (Q high) it, generating an error flag to computer 5 which is automatically interrogated following an add complete interrupt.

In order to properly control flip-flop 101 to indicate the add complete interrupt, the output of gate 119 is connected to one input of a NAND gate 127 which has a second input connected to the Q output of flip-flop 123. The output of gate 127 is connected to one input of a NAND gate 129 which has a second input connected to the output of gate 83 and a third input connected to the output of one-shot 91 (T24'). The output of gate 129 is connected to the R input of flip-flop 101 so that when the output of NAND gate 129 goes low, resetting flip-flop 101 the add complete interrupt is applied to the computer 5 by the negative going Q output signal.

To summarize the operation of the circuit shown in FIG. 3C, it will be understood that the circuit looks for 22 consecutive zeros at the adders 31 and 45 (FIG. 3B) outputs, respectively, during the period of the T1-T22 add pulses and if these outputs are low for all pulses (T1-T22), the add complete interrupt is generated. Referring to the illustrated X code monitor 103, all zeroes from the adder 31 during the period T1-T22 prevent the flip-flop 111 from being set and thus the X input of gate 113 remains low. If there is no error, the Y input of gate 113 will also be low causing the output of NAND gate 113 to go high and the output of NAND gate 119 will be low preventing the generation of an error flag by setting flip-flop 123. Thus, the Q output of flip-flop 123 remains high and the output of NAND gate 127 is high due to the low from gate 119. This enables gate 129 to go low when the T24' pulse from circuit 91 is applied to the third input thereof, resetting flip-flop 101 which applies a low from the Q output of flip-flop 101 to the end of block interrupt in the computer 5 indicating that the addition has been completed. At this time computer 5 interrogates the Q output of flip-flop 123 to check the error flag. If the 1000---0 code from both adders 31 and 45 did not appear at the same time, which is the case if there is an error, the output of gate 119 will go high, since one of the monitor outputs 103 or 105 would be high, at T23 causing gate 121 to set flip-flop 123. However, the end of block signal at flip-flop 101 still appears because the Q output of flip-flop 123 is then low keeping the output of gate 127 high which is necessary for enabling 129 on the T24' pulse. For example, if there is an error in the X axis addition in which the last sum is not 1000---0, gate 107 would then set flip-flop 111 causing the X input of gate 113 to be high. Assuming there is no error in the Y axis addition, the Y input of gate 113 is low and the output high. The gate 121 output will go high at the T23 pulse to set flip-flop 123, thereby generating an error flag.

The operation of the system may best be exemplified by referring now to FIGS. 3A, 3B, and 3C recalling that the DDA requires that the add commands be of proper content and timing. Therefore, for illustration purposes, assume that specific requirements call for an add command signal with a repetition rate from 8 to 16,384 microseconds. Also, each add command signal must consist of a burst of 24 pulses spaced ⅛ microsecond apart. In this example, assume that the time for running a particular block of information is 16 milliseconds and that 16 add commands are specified. The add rate commands will be spaced according to the (known) relationship:

Time/addition = time/block ÷ number of additions

The time/addition is accordingly 1000 microseconds.

The 3 Mhz clock 19 is used to generate the burst of 24 pulses (T1–T24) under control of the counter 77. With the T24' pulses continuously applied to counter 77, 24 clock pulses (T1–T24) are gated through gate 83 when counter 77 overflows. With a time/addition of 1000 microseconds, the number of counts to counter 77 for each add command generated by the overflow of counter 77 is found from the following relationship:

number of counts/add command = time/addition ÷ 8 $\mu$sec/pulse = 1000/8 = $125_{10}$ = $175_8$ This number then determines the CLKSTR number stored in the computer 5 and loaded into the CLKSTR register 69 for this particular block. The number is first converted to binary form (1111101) and since the CLKSTR register is an 11-bit register, the number stored in computer 5 would be (00001111101). This number is converted to the 2's complement (11110000011) which is the CLKSTR number loaded into register 69. This number is then loaded into counter 77 and then repeatedly loaded into counter 77 each time the counter is counted to overflow to generate an add command. Thus, the counter 77 is preset to the 2's complement of the time per addition value and counted to overflow, and it will be seen that the rate at which counter 77 overflows is dependent on the magnitude of the CLKSTR number, assuming that the pulses from gate 67 (FIG. 3A) are at the maximum rate of 8 microseconds per pulse or 125 K pulses per second.

When a block of data is to be run, the computer loads the distance information into the X and Y distance registers 7 and 11 and the CLKSTR value into the register 69. After the CLKSTR value is loaded into storage register 69 it is automatically loaded into the counter 77 following a short delay through delay circuit 75. Counter 77 counts at the rate of one count every 8 microseconds, determined by the occurrence of successive pulses from gate 67, until counter 77 overflows. This one, in turn, enables gate 83 via the setting of flip-flop 81 to emit a T1–T24 add command pulse train. The gate 83 is closed by the resetting of flip-flop 81 at the T24' pulse from one-shot 91. The overflow from counter 77 is also used to reload, via delay 75, the same storage register 69 contents into the counter 77 before another T24 pulse can occur.

In the above fashion, the add command pulse train burst consists of evenly spaced pulses within the burst with the pulse repetition rate of the burst determined by the CLKSTR value. As described above, the end of block code is recognized by the X-Y add complete logic 57 (FIG. 1) to generate an interrupt to computer 5, following which the error flag is interrogated at flip-flop 123 (FIG. 3C). If there is no error flag present the computer 5 clears the system and loads a new block including the CLKSTR value in register 69 and the X-Y distance values into distance registers 7 and 11 and the cycle is repeated, generating the proper X and Y command pulses for each block until the program is completed.

Thus, it will be seen that a hardware digital differential analyzer has been provided for generating travel command pulses for a machine tool positioning system which reduces computer time and allows faster tool speed, especially for multiple axis machines. By providing an improved add command generator for control of multiple axis additions to produce command pulses simultaneously for each axis, rather than sequentially in the case of software additions, the tool speed is only limited by the tool drive system response.

Although the invention has been illustrated by way of one embodiment for application to a two-axis positioning system, it will be obvious to those skilled in the art that the invention applies as well to machines with one or multiple degrees of freedom of movement and that this embodiment is given for example only and not in a limiting sense.

What is claimed is:

1. In combination with a positioning system for automatic positioning of at least one positionable member driven by a drive means along an axis at a rate responsive to the rate of command pulses applied to said drive means and including a computer having a data storage means in the form of a plurality of blocks of information each relating to a particular motion to be achieved by said positionable member, a command pulse generator, comprising:

a distance value storage shift register coupled to said computer memory for storing a distance value in binary form corresponding to the distance said positionable member is to be moved during the execution of a data block from said data storage means by said computer, a summation shift register, adder means for adding the distance value of said distance register and the contents of said summation register one bit at a time in response to a train of shift pulses applied to shift inputs of said distance register and said summation register equal to the number of bits of said distance storage register and said summation register during an add command interval and serially loading the sum at a sum output of said adder means into said summation register, and means responsive to an overflow condition of said adder means during the last bit addition for each of said add command intervals for generating said command pulses; and an add command generator including a time value storage register coupled to said computer memory for storing a binary time control value from the corresponding data block stored in said computer, said time value controlling the time said positionable member is to move the distance specified by the corresponding distance value loaded into said distance storage register for the execution of a data block, a presettable binary counter having a predetermined maximum count level at which an overflow pulse is generated at an overflow output thereof, said presettable counter being connected to said time value storage register and repeatedly preset to said binary time control value stored in said time value storage register each time said presettable counter overflows, a pulse train generator means for generating a repeating train of pulses corresponding in number to the number of said train of shift pulses, a first gating means responsive to the last pulse of each of said repeating train of pulses for applying a count pulse to a count input of said presettable counter and a second gating means responsive to each overflow pulse from said presettable counter for gating one of said repeating pulse trains to said shift inputs of said distance register and said summation register each time said presettable counter overflows so that the rate of generation of command pulses is controlled by the value stored in said time value storage register for each of said data blocks.

2. The combination as set forth in claim 1 further including logic circuit means responsive to the sum output of said adder means for generating an end-of-block interrupt to said computer following the generation of the number of command pulses specified by said distance value loaded in said distance storage register for the corresponding data block.

3. The combination as set forth in claim 2 wherein said pulse train generator means and said first and second gating means include a clock pulse source for generating clock pulses at an output thereof at a predetermined fixed frequency, a binary ring counter having a count input connected to the output of said clock pulse source for generating a repeating number of count pulses equal in number to the number of said train of shift pulses at a frequency corresponding to the frequency of said clock pulses, a one-shot having an input connected to receive the highest count of said ring counter and generating an output signal at an output thereof having a period substantially less than the period of one of said clock pulses, a first AND gate having a first input connected to the output of said one-shot and an output connected to the count input of said presettable counter, a flip-flop having set and reset inputs and a set output for controlling said add command intervals, said set input connected to the overflow output of said presettable counter and said reset input connected to the output of said one-shot, a second AND gate having a first input connected to said set output of said flip-flop, a second input connected to the output of said clock source, and an output connected to said shift inputs of said distance register and said summation shift register, and a sync circuit means having an output connected to a second input of said first AND gate and responsive to said clock pulses and the first count of the repeating count of said ring counter for variably controlling the passage of pulses from said one-shot through said first AND gate from a maximum rate equal to the period of said ring counter to a rate substantially equal to zero.

4. The combination as set forth in claim 3 wherein said sync circuit includes a variable oscillator having a maximum frequency whose period is equal to the counting period of said ring counter and switching means responsive to the period of the output of said variable oscillator for applying an enabling signal to said second input of said first AND gate at a rate depending upon the frequency of said variable oscillator, thereby controlling the count rate to said presettable counter and thus the velocity of said positionable member.

5. In combination with a computer controlled positioning system for automatic machining including a computer having a storage means for part description data and machine control, and at least one positionable member driven by a drive means along an axis at a rate controlled by the rate of command pulses applied to said drive means, a digital differential analyzer for generating said command pulses by repeated serial additions of a distance value of a data block from said part description data stored in said computer, comprising:

a first shift register having parallel load and serial load inputs and a serial output, said first shift register being connected to said computer so as to be parallel loaded to store said distance value from said part description data stored in said computer corresponding to the distance said positionable member is to be moved during a data block, said serial output of said first shift register connected to said serial input thereof so that when said distance value is serially shifted through said register it is serially reloaded into said register;

a second shift register having a serial load input and output;

a binary adder having first and second inputs connected to said serial outputs of said first and second shift registers for performing said serial addition and generating a signal at an output which is the binary sum of the signals applied to said first and second inputs thereof, said output of said adder connected to said serial input of said second shift register;

a storage register having parallel load inputs coupled to said computer memory and parallel transfer outputs for storing a binary value which controls the time of movement of said positionable member for the corresponding distance data block loaded into said first shift register;

a presettable counter coupled to said parallel transfer outputs of said storage register, said presettable counter having a predetermined maximum count level and an overflow output for generating an output pulse when said maximum count level is exceeded;

a clock pulse source for generating clock pulses at an output thereof at a predetermined fixed frequency;

means responsive to the output of said clock pulse source for generating a predetermined number of count pulses at a frequency corresponding to said clock pulse frequency;

a first gating means responsive to the last count of said count pulse generating means for applying a count pulse to said count input of said presettable counter each time said count pulse generating means registers said last count;

a second gating means responsive to overflow pulses from said overflow output of said presettable counter for gating a predetermined number of clock pulses to said shift inputs of said first and second shift registers corresponding to the number of bits of said first and second shift registers so that the bits of said first and second shift registers are simultaneously serially applied to said first and second inputs of said adder and the sum is serially loaded into said second shift register; and a third gating means responsive to an overflow output of said adder corresponding in time to the last pulse of said predetermined number of clock pulses for gating a command pulse to said drive means each time said adder overflows following a serial addition of the binary bits of said first and second shift registers.

6. The combination as set forth in claim 5 further including logic circuit means responsive to the sum output of said adder means for generating an end-of-block interrupt of said computer in response to a predetermined binary sum code generated during the last serial addition necessary to generate the specified number of command pulses to said drive means.

* * * * *